United States Patent
Champion et al.

(10) Patent No.: US 9,407,887 B2
(45) Date of Patent: Aug. 2, 2016

(54) CONTROLLED LIGHT SOURCE STARTUP IN A DISPLAY

(75) Inventors: Mark Champion, Kenmore, WA (US); Heng Huang, Sammamish, WA (US)

(73) Assignee: Microvision, Inc., Redmond, WA (US)

(*) Notice: Subject to any disclaimer, the term of this patent is extended or adjusted under 35 U.S.C. 154(b) by 1884 days.

(21) Appl. No.: 12/754,995

(22) Filed: Apr. 6, 2010

(65) Prior Publication Data

US 2011/0181574 A1 Jul. 28, 2011

Related U.S. Application Data

(60) Provisional application No. 61/298,722, filed on Jan. 27, 2010.

(51) Int. Cl.
*H04N 9/31* (2006.01)
*G09G 3/02* (2006.01)
*G09G 3/34* (2006.01)

(52) U.S. Cl.
CPC .............. *H04N 9/3155* (2013.01); *G09G 3/025* (2013.01); *G09G 3/3406* (2013.01); *G09G 2320/0626* (2013.01); *G09G 2330/026* (2013.01); *G09G 2330/12* (2013.01); *G09G 2340/04* (2013.01)

(58) Field of Classification Search
None
See application file for complete search history.

(56) References Cited

U.S. PATENT DOCUMENTS

| 8,218,216 B2 * | 7/2012 | Konno et al. ............... 359/202.1 |
| 8,355,033 B2 * | 1/2013 | Deppe ............................ 345/690 |
| 2005/0117615 A1 * | 6/2005 | Fujiie et al. ................. 372/38.04 |
| 2006/0209374 A1 * | 9/2006 | Willemsen .................... 359/205 |

* cited by examiner

*Primary Examiner* — Nicholas Lee
*Assistant Examiner* — Duane N Taylor, Jr.
(74) *Attorney, Agent, or Firm* — Kevin D. Wills

(57) ABSTRACT

Briefly, in accordance with one or more embodiments, a display is powered on to display a projected image, and the operation of one or more display elements are ramped up until a stabilized state is reached. During said ramping up, a light source of the display is powered display at less than full power until the stabilized state is reached. While the light source is operating at less than full power, a splash screen may be displayed. After the stabilized state is reached, the light source can then be operated at or near full power. By providing a light output that is less than full power during ramp up, the display does not need to wait until the stabilized state is reached before the light source is powered on. As a result, the projector provides an output earlier in time to cue to the user that the projector is operating.

9 Claims, 6 Drawing Sheets

US 9,407,887 B2

CONTROLLED LIGHT SOURCE STARTUP IN A DISPLAY

CROSS-REFERENCE TO RELATED APPLICATIONS

The present application claims the benefit of U.S. Provisional Application No. 61/298,722 filed Jan. 27, 2010 in the name of inventors Mark Champion and Heng Huang. Said Application No. 61/298,722 is hereby incorporated by reference in its entirety.

BACKGROUND

When turning on electronic devices such as projectors or other devices that emit light as an output, the user typically looks for whether the device is outputting light as a cue to determine if the device is working properly. For some light emitting devices such as laser pointers, the device may instantly emit light in response to turning the device on, thereby giving the user immediate feedback that the device is working. However, some devices may have a predetermined startup time after the user has turned the device on. The device is working properly, but the user may not be aware that the device is working but just needs to startup before the device starts to emit light. Users who are not cognizant of the startup time may attempt to look directly into the emission port to check whether the device is working properly. If the device completes its startup while the user is looking into the emission port, the device may inadvertently provide a full power emission into the user's eye.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
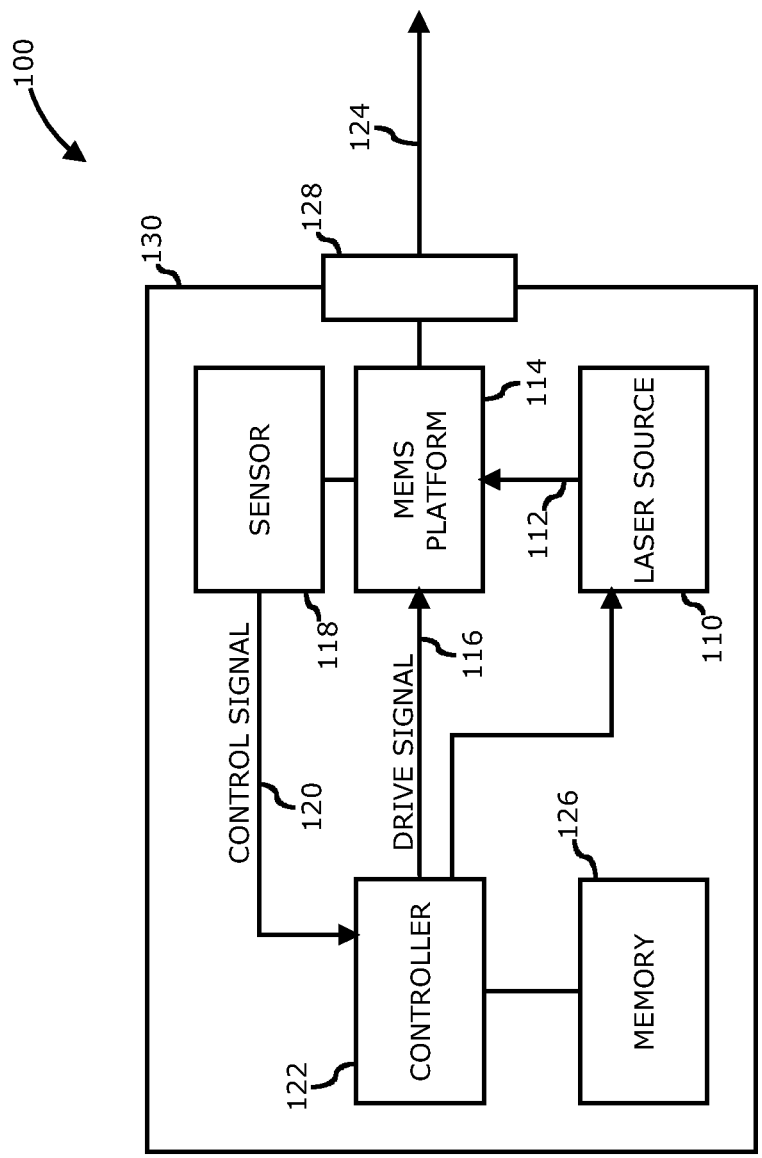
FIG. 1 is a control system for a display in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a control system for a display in accordance with one or more embodiments will be discussed. As shown in FIG. 1, control system 100 may be utilized to control the light output 124 of a display device at startup of the display device. The display device may be any type of display or projector that provides a light output to display an image. Examples of such a display device may include, but are not limited to, a scanned laser beam display, a digital light projector (DLP), a liquid crystal display (LCD) projector, a liquid crystal on silicon (LCOS) projector, and so on. However, these are merely example types of displays that may have a light output that is controlled at startup by control system 100, and the scope of the claimed subject matter is not limited in this respect. For purposes of example, a scanned laser projector will be discussed, which is shown in and described with respect to FIG. 5, below, in further detail. However, the example discussed herein may also be applied to other types of display systems, and the scope of the claimed subject matter is not limited in this respect.

In one or more embodiments, a display may be disposed in housing 130 having a window 128 or emission port through which the light output 124 of the display may be emitted. In the example shown in FIG. 1, light output 124 may comprise one or more laser beams emitted from a laser source 110. The laser source 110 emits one or more beams 112, which may be a monochrome beam and/or a multichromatic beam. Beam 112 impinges on a microelectromechanical system (MEMS) platform 114 which is controlled by controller 122 via drive signal 116 to scan the beam 112 through window 128 as light output 124. MEMS platform 114 drives light output 124 into a scan pattern to create a projected image on a remote projection surface.

During startup, upon controller 122 initially driving MEMS platform 114 with drive signal 116, MEMS platform 114 oscillates in one or more directions in response to drive signal 116 and ramps up over a period of time to a stabilized oscillation rate. During the ramp up time of MEMS platform 114, the laser source 110 typically is not operated at full power in order to avoid an undesirable higher power level of light output 124 before MEMS platform 114 is at the stabilized point of operation and reaches full scale deflection along one or more axes of rotation. In one or more embodiments, rather than waiting for MEMS platform 114 to reach the stabilization point before turning on laser source 110, the power of laser source 110 may be increased over time, for example via ramping or step-wise increases in power, as the MEMS platform 114 is ramping up its operation until the MEMS platform 114 is stabilized at which point full power may be applied to laser source 110. In such an arrangement, light output 124 will be emitted by the display sooner but at lower power, thereby providing a faster visual cue to the user that the display is working. In general, a starting period may include the ramping up of one or more elements of a display, but a starting period is so not limited in this respect and may not include or require ramping up. Furthermore, in general, a starting period may last until a predetermined condition is reached such as a sufficiently stabilized state of one or more elements of the display, however a predetermined condition may be any condition that defines and/or ends a starting period including but not limited to a selected amount of time elapsing, a selected temperature of one or more elements being reached, an oscillation of one or more display elements at a given rate and/or amplitude, or a selected point being reached on a curve or plot depicting an operation of one or more display elements, and so on, and the scope of the claimed subject matter is not limited in these respects.

In order to determine the current state of MEMS platform 114 during its ramp up period, a sensor 118 may be utilized to provide a control signal 120 as a feedback signal to controller 122. The control signal 120 may be utilized by controller 122 to control the ramp up of the output power of laser source 110 accordingly. A memory 126 coupled to controller 122 may store the instructions used to control the manner in which the power of laser source 110 is increased based at least in part on the ramp up state of MEMS platform 114. In some embodiments, memory 126 is an external memory device such as flash memory or other non-volatile memory to store the instructions for controlling the power of laser source 110, and in other embodiments memory 126 may be integrated with controller 122. Likewise, the instructions could be implemented in a hardware state machine. The scope of the claimed subject matter is not limited in these respects. In one or more embodiments, sensor 118 may include one or more piezoresistive (PZR) sensors to generate control signal 120 at least in part based on an amount of torsional deflection along one or more axes of MEMS platform 114 that is capable of being detected by the PZR sensors. In one or more alternative embodiments, sensor 118 may include one or more temperature sensors to detect the temperature of MEMS platform 114 to determine when MEMS platform 114 is at a steady, stabilized state, for example where MEMS platform 14 is heated during operation. However, these are merely examples of the types of sensors that may be utilized to determine the progress of MEMS platform 114 during its ramp up time, and the scope of the claimed subject matter is not limited in this respect.

In one or more embodiments, there may be several methods by which the light output 124 may be controlled during startup. In one embodiment, laser source 110 is operated at a lower power level while MEMS platform 114 is ramping up, and when MEMS platform 114 has reached a stabilized state then laser source 110 is operated at full power. In another embodiment, the power of laser source 110 may be gradually increased over time while MEMS platform 114 is ramping up, such that the power versus time curve of laser source 110 is linear or a gradual curve that reaches full power at the time, or sometime thereafter, when MEMS platform 114 reaches a stabilization state. In yet another embodiment, the power of laser source 114 may be step wise or linearly increased until full power is reached, for example wherein the power may be increased by a fix amount periodically for a given amount of time, or alternatively the steps may be increased by a non-linear or irregular amount. In one or more further embodiments, the power of laser source 110 may be increased in response to a detected event such as the MEMS platform 114 reaching a predetermined state detected by sensor 118. However, these are merely examples of several possible manners in which the power of laser source 110 may be controlled, and the scope of the claimed subject matter is not limited in this respect. Specific examples of how the power of laser source 110 may be controlled to control the light output 124 of a display are shown in and described with respect to FIG. 2 and FIG. 3, below.

Figure 2:
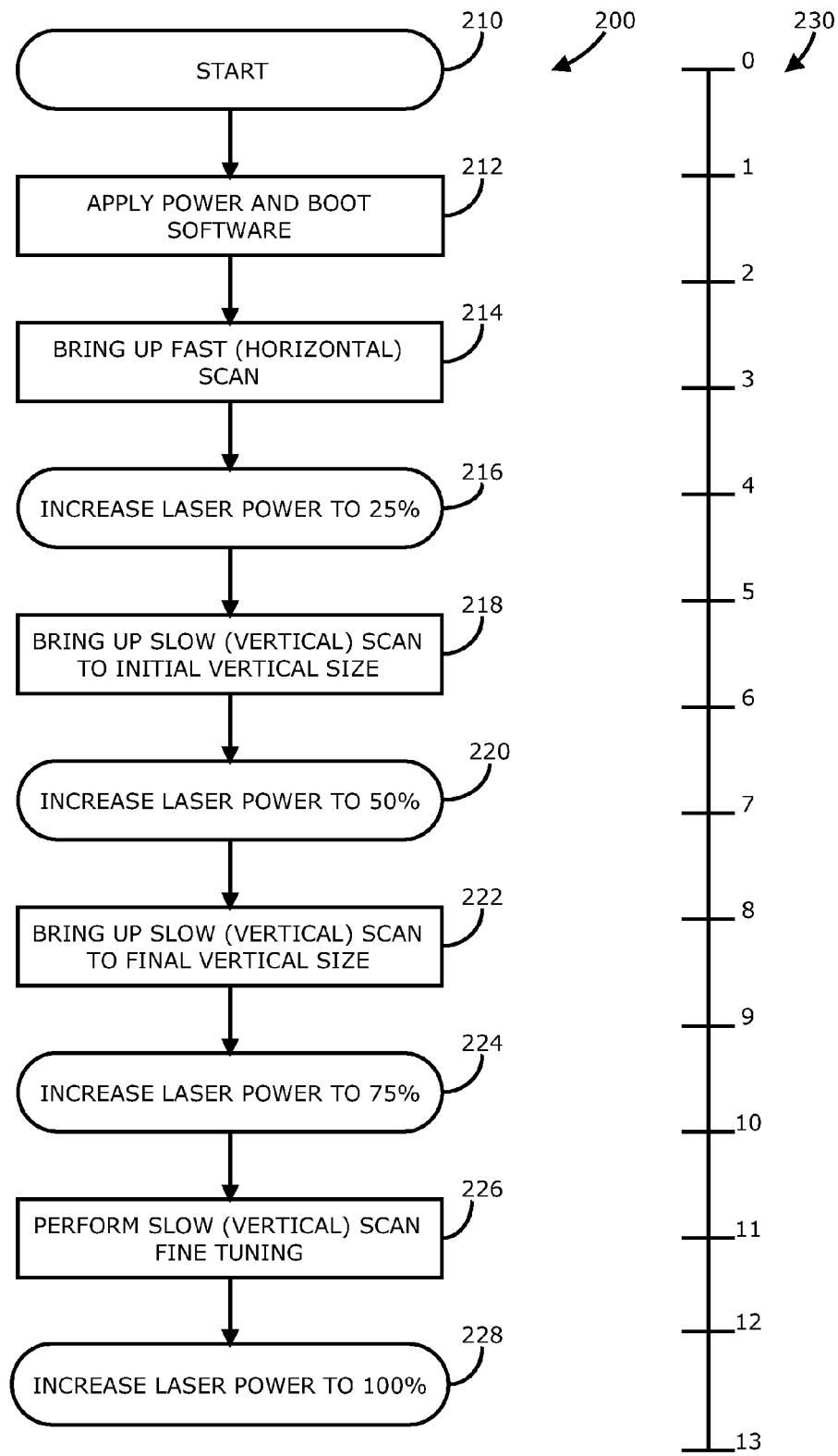
FIG. 2 is a flow diagram of a method for controlling a light source at startup of a display in accordance with one or more embodiments.

Referring now to FIG. 2, a flow diagram of a method for controlling a light source at startup of a display in accordance with one or more embodiments will be discussed. As shown in FIG. 2, method 200 may be implemented by control system 100 of a display to control the light output 124 during startup. Method 200 shown in FIG. 2 is merely one example of how light output 124 may be controlled, and alternatively may include more or fewer blocks than shown in FIG. 2, and/or may include a different ordering of the blocks, and the scope of the claimed subject matter is not limited in this respect. An approximate time scale 230 is shown alongside the flow chart of method 200 to illustrate an example time line of events during the startup of the display. It should be noted that the time scale 230 is merely provided for purposes of example, and the exact timing of the events of method 200 may be different than that shown in FIG. 2 in one or more alternative embodiments, and the scope of the claimed subject matter is not limited in this respect. In particular and as will be discussed below, time scale 230 indicates that power may be applied to laser source 110 before MEMS platform 114 has reached a stabilization state.

The display may be turned on at start block 210, at which time power may be applied to the various circuits of the display and software for controller 122 may boot at block 212. Where MEMS platform 114 is a biaxial scanner having two orthogonal scan axes, the fast scan (horizontal) axis of MEMS platform 114 may be ramped up at block 214 in response to drive signal 116. Once the fast scan axis has started, the power of laser source 110 may be turned on and increased to about 25% of full power at block 216, which results in the emission of light output 124 from the display at an earlier time than the point of stabilization or MEMS platform 114. Next, the slow (vertical) scan of MEMS platform 114 may be ramped up at block 218 to cause the image displayed by the display to start at an initial size and to increase in vertical size over time. Once the vertical scan of MEMS platform 114 has reached a predetermined initial size, the power of laser source 110 may be increased at block 220 to about 50% of full power. Then, the slow scan of MEMS platform 114 may be gradually increased until it reaches or approximately reaches a final vertical size at block 222 for the display at which time the power of laser source 110 may be increased to about 75% at block 224. Next, the slow can of MEMS platform 226 may be fine tuned at block 226, and once the fine tuning of the slow scan is complete and MEMS platform 114 is at a stabilized state, the power of laser source 110 may be increase to 100% of full power at block 228. An example output projected by a display using method 200 is shown in and described with respect to FIG. 4, below. An alternative embodiment for controlling the light output 124 of the display is shown in and described next with respect to FIG. 3, below.

Figure 3:
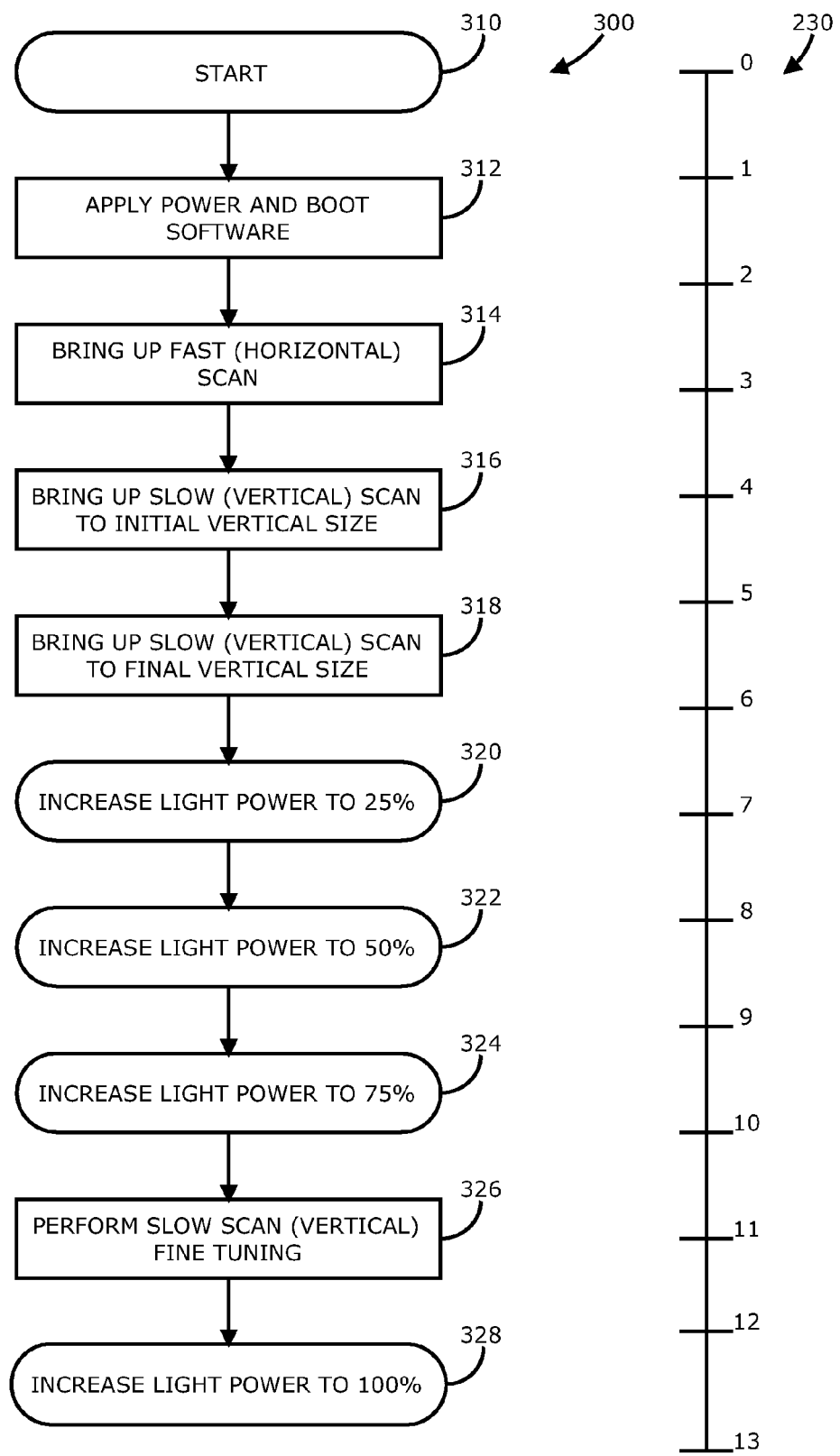
FIG. 3 is a flow diagram of an alternative method controlling a light source at startup of a display in accordance with one or more embodiments.

Referring now to FIG. 3, a flow diagram of an alternative method for a controlling a light source at startup of a display in accordance with one or more embodiments will be discussed. Method 300 of FIG. 3 is substantially similar to method 200 of FIG. 2 except that the blocks of method 300 are arranged in an alternative order. As shown in FIG. 3, method 300 may be implemented by control system 100 of a display to control the light output 124 during startup. Method 300 shown in FIG. 3 is merely one example of how light output 124 may be controlled, and alternatively may include more or fewer blocks than shown in FIG. 3, and/or may include a different ordering of the blocks, and the scope of the claimed subject matter is not limited in this respect. An approximate time scale 230 is shown alongside the flow chart of method 300 to illustrate an example time line of events during the startup of the display. It should be noted that the time scale 230 is merely provided for purposes of example, and the exact timing of the events of method 300 may be different than that shown in FIG. 3 in one or more alternative embodiments, and the scope of the claimed subject matter is not limited in this respect. In particular and as will be discussed below, time scale 230 indicates that power may be applied to laser source 110 before MEMS platform 114 has reached a stabilization state.

The display may be turned on or started at block 310 at which time power may be applied to the circuits of the display and the software may be booted at block 312. The fast (horizontal) scan of MEMS platform 114 may be started at block 314, and then the slow (vertical) scan of MEMS platform 114 may be brought up to an initial vertical size at block 316. After the slow scan of MEMS platform 114 is increased to a final or nearly final vertical size at block 318, the power of light source 110 may be turned on an increased to about 25% power at block 320, then to about 50% power at block 322, then to about 75% power at block 324. The slow scan of MEMS platform 114 may be finalized at block 326 until MEMS platform 114 reaches a stabilized state, at which time the power of light source 110 may be increased to 100% of full power at block 328. It should be noted that although FIG. 2 shows one embodiment of a control method 200 and FIG. 3 shows another embodiment of a control method 300, various other control methods to control the light output of the display during startup may be implemented, and the scope of the claimed subject matter is not limited in this respect. An example controlled light output of the display during startup is shown in and described with respect to FIG. 4, below.

Figure 4:
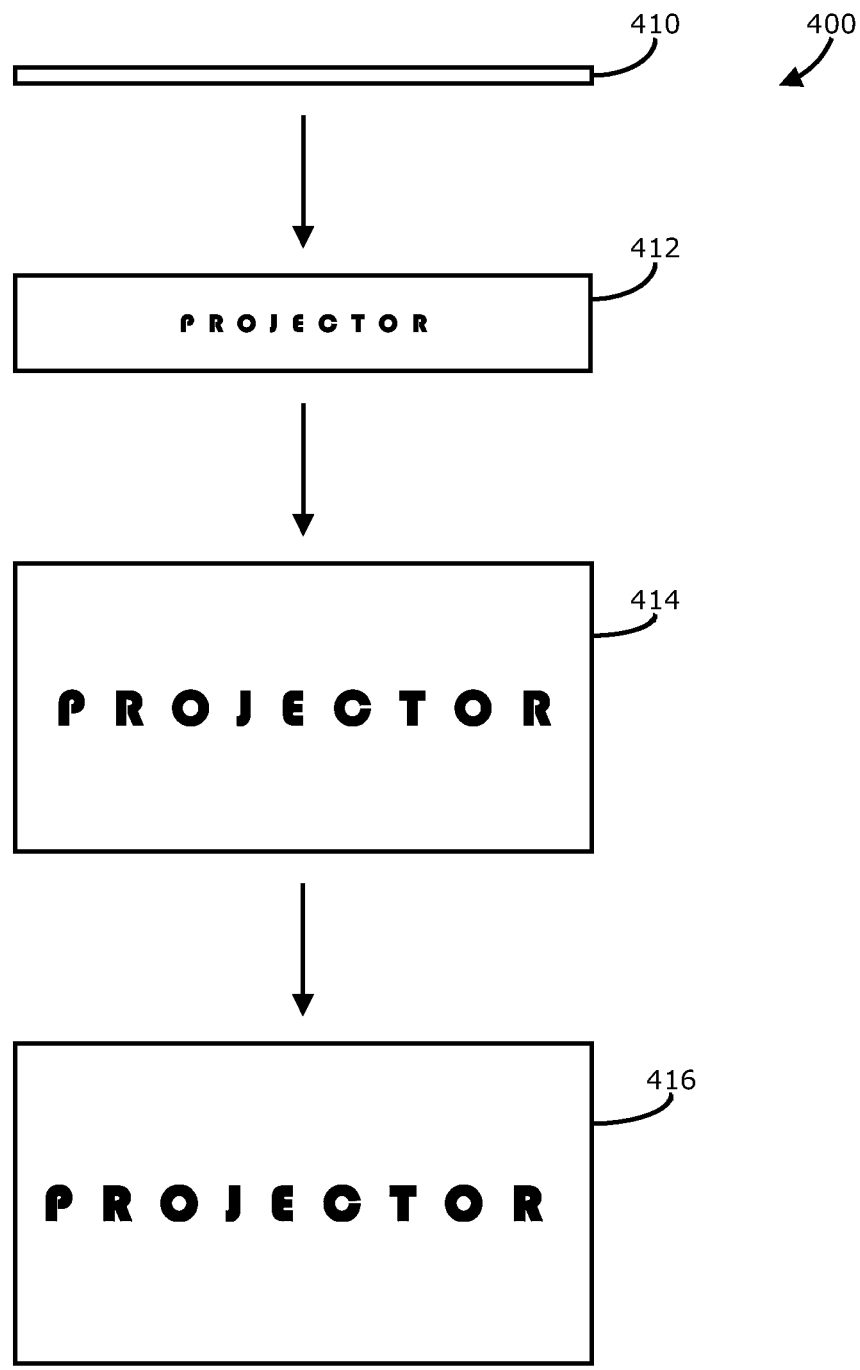
FIG. 4 is a diagram of an image displayed by a display with a controlled light source during startup in accordance with one or more embodiments.

Referring now to FIG. 4, a diagram of an image displayed by a display with a controlled light source during startup in accordance with one or more embodiments will be discussed. Diagram 400 illustrates an example image that may be displayed as a light output of the display during a controlled startup of the projector. The images of diagram 400 correspond to the example method 200 of FIG. 2, above. In one or more embodiments, controller 122 may cause the display to display a splash screen during the ramp up period of MEMS platform 114. The splash screen, which as an example is the word "PROJECTOR" as shown in FIG. 4, may be stored in memory 126 which may be accessed by controller 122 during startup to cause MEMS platform 114 to scan an image corresponding to the splash screen during startup. Once the startup process is complete, the display may then display a regular video image. However, displaying a splash screen is merely one example of the video content that may be displayed by the display during the control of the light output 124 during startup, and the scope of the claimed subject matter is not limited in this respect. Referring to image 410, the fast (horizontal) scan of MEMS platform 114 may be actuated while the slow (vertical) scan of MEMS platform 114 is not yet turned on. If the light source is turned on at this point, for example at 25% power at block 216 of FIG. 2, the resulting image 410 will be a horizontal line with essentially no vertical height. As the fast (vertical) scan of MEMS platform 114 is brought up to an initial vertical size, for example at block 218 of FIG. 2, the image of the splash screen will be discernable as image 412. The image of 412 may be at or near a full width, while being smaller in vertical height than a full sized image. As the slow (vertical) scan of MEMS platform 114 is brought at or near a final vertical size, for example at block 222 of FIG. 2, a full or nearly full size image 414 is displayed, and when laser power is increased to 75% of full power at block 224 of FIG. 2, the image of the splash screen may be more viewed with greater intensity. After the slow (vertical) scan of MEMS platform 114 is fine tuned and a stabilized state is reached, for example at block 226 of FIG. 2, the final size of the image of the splash screen may be discerned at image 416, and when laser power is increased to 100% of full power at block 228 of FIG. 2, the image of the splash screen may be viewed with a highest and/or final intensity. It should be noted that the images of diagram 400 correspond to the example method 200 of FIG. 2, the images will likewise be accordingly different for different control method embodiments such as for method 300 of FIG. 3, and/or any other alternative method, and the scope of the claimed subject matter is not limited in this respect. An example display capable of utilizing control system 100 of FIG. 1 to implement a light output startup control method, such as method 200 of FIG. 2 or method 300 of FIG. 3, is shown in and described with respect to FIG. 5, below.

Figure 5:
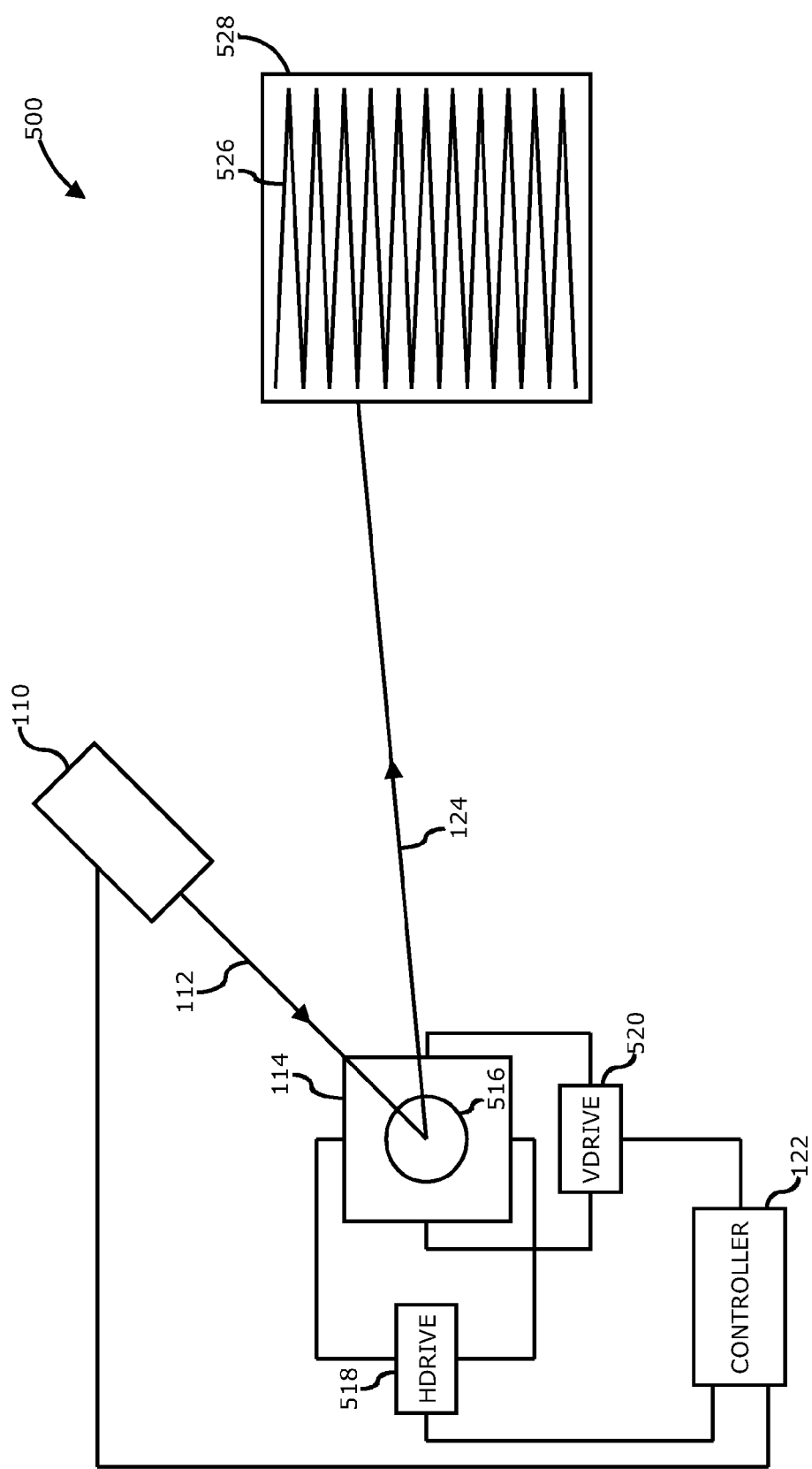
FIG. 5 is diagram of a scanned beam display capable of providing a controlled light source startup in accordance with one or more embodiments.

Referring now to FIG. 5, a diagram of a scanned beam display in accordance with one or more embodiments will be discussed. Although FIG. 5 illustrates one type of display system for purposes of discussion, for example a microelectromechanical system (MEMS) based scanned laser beam display, it should be noted that other types of displays may also be utilized may also utilize the claimed subject matter and the scope of the claimed subject matter is not limited in this respect. Examples of such displays may include, but are not limited to, a scanned laser beam display, a digital light projector (DLP), a liquid crystal display (LCD) projector, a liquid crystal on silicon (LCOS) projector, and so on. However, these are merely example types of displays that may have a light output that is controlled at startup, and the scope of the claimed subject matter is not limited in this respect. In some embodiments, scanned beam display 100 may be adapted to project a monochrome image, a multichromatic image such as a red, green, blue (RGB) image, a three-dimensional image, among many examples. Details of operation of scanned beam display 500 are discussed, below.

As shown in FIG. 5, scanned beam display 500 comprises a light source 110, which may be a laser light source such as a laser or the like, capable of emitting a beam 112 which may comprise a laser beam. In some embodiments, light source 110 may comprise two or more light sources, such as in a color system having red, green, and blue light sources, wherein the beams from the light sources may be combined into a single beam 112. In one or more embodiments, light source 110 may include full color light sources such as a red, green, and blue light source, and optionally may include a fourth light source to emit an invisible beam such as an ultraviolet beam or an infrared beam. The beam 112 is incident on a scanning platform 114 which may comprise a microelectromechanical system (MEMS) based scanner or the like in one or more embodiments, and reflects off of scanning mirror 516 to generate a controlled output beam 124. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon (LCOS) device, or other similar scanning or modulating devices. A horizontal drive circuit 518 and/or a vertical drive circuit 520 may modulate the direction in which scanning mirror 516 is deflected to cause output beam 124 to generate a scan pattern 526, thereby creating a displayed image, for example on a display screen and/or image plane 528. Controller 122 controls horizontal drive circuit 518 and vertical drive circuit 520 by converting pixel information of the displayed image into laser modulation synchronous to the scanning platform 114 to write the image information as a displayed image based upon the position of the output beam 124 in scan pattern 526 and the corresponding intensity and/or color information at the corresponding pixel in the image. Controller 122 may also control other various functions of scanned beam display 500.

In one or more embodiments, for two dimensional scanning to generate a two dimensional image, a horizontal axis may refer to the horizontal direction of scan pattern 526 and the vertical axis may refer to the vertical direction of scan pattern 526. Scanning mirror 516 may sweep the output beam 124 horizontally at a relatively higher frequency and also vertically at a relatively lower frequency. The result is a scanned trajectory of laser beam 124 to result in scan pattern 526. The fast and slow axes may also be interchanged such that the fast scan is in the vertical direction and the slow scan is in the horizontal direction. However, the scope of the claimed subject matter is not limited in these respects. An example of an information handling system that incorporates a display capable of providing a controlled light output during startup is shown in and described with respect to FIG. 6, below.

Figure 6:
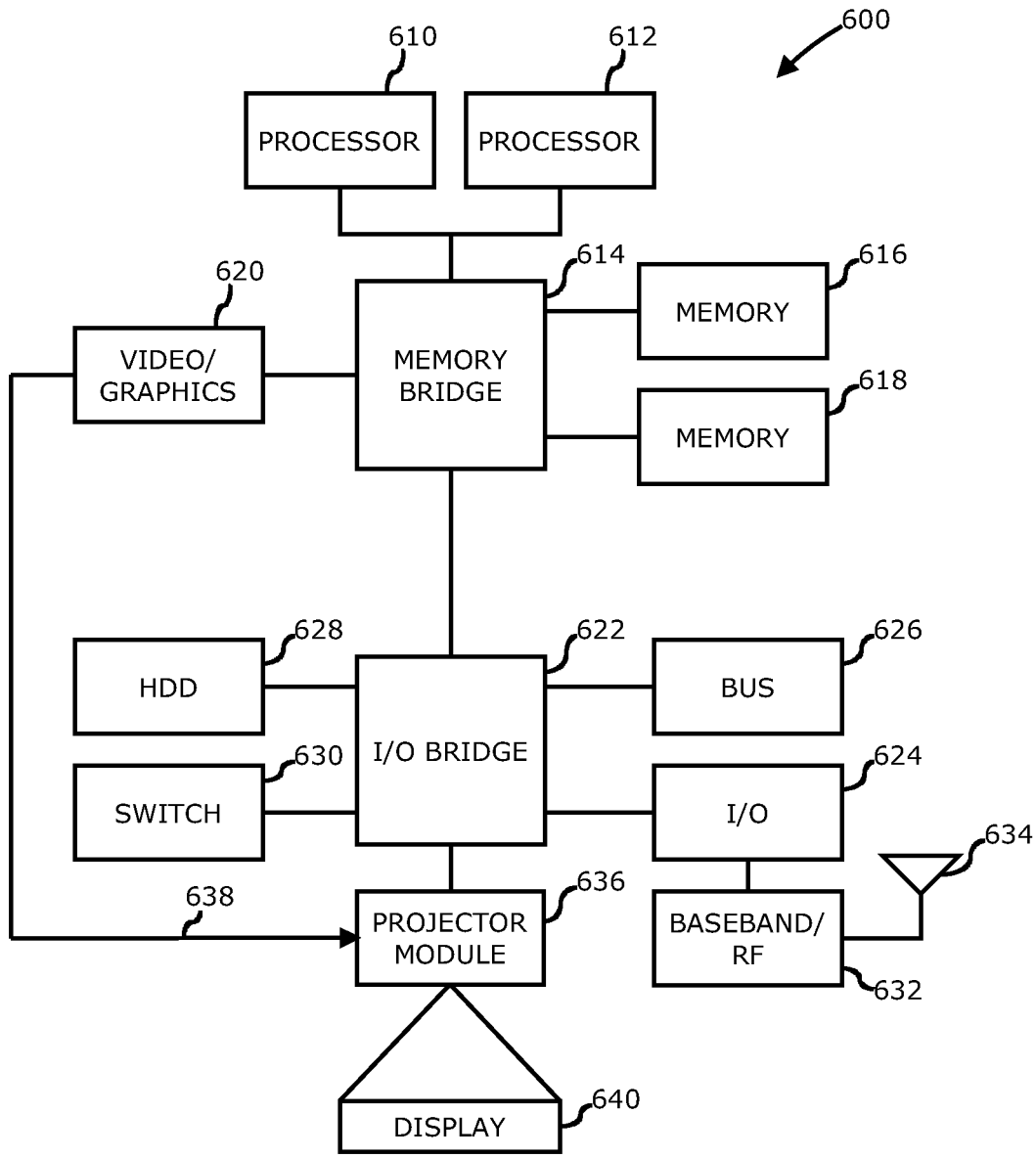
FIG. 6 is a diagram of an information handling system having a projector capable of providing a controlled light source output during startup in accordance with one or more embodiments.

Referring now to FIG. 6, a block diagram of an information handling system utilizing a display having a controlled light output during startup in accordance with one or more embodiments will be discussed. Information handling system 600 of FIG. 6 may tangibly embody scanned beam display 500 as shown in and described with respect to FIG. 5, above. Although information handling system 600 represents one example of several types of computing platforms, including cell phones, personal digital assistants (PDAs), netbooks, notebooks, internet browsing devices, music players, and so on, information handling system 600 may include more or fewer elements and/or different arrangements of the elements than shown in FIG. 6, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more of processors 610 and/or 612. Memory 616 and/or memory 618 may comprise various types of semiconductor based memory, for example volatile type memory and/or non-volatile type memory. Memory bridge 614 may couple to a video/graphics system 620 to drive a display device, which may comprise projector 636, coupled to information handling system 600. Projector 636 may comprise scanned beam display 500 of FIG. 5. In one or more embodiments, video/graphics system 620 may couple to one or more of processors 610 and/or 612 and may be disposed on the same core as the processor 610 and/or 612, although the scope of the claimed subject matter is not limited in this respect.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 630 may be utilized to couple one or more switched devices to I/O bridge 622, for example Gigabit Ethernet type devices or the like. Furthermore, as shown in FIG. 6, information handling system 600 may include a baseband and radio-frequency (RF) block 632 comprising a base band processor and/or RF circuits and devices for wireless communication with other wireless communication devices and/or via wireless networks via antenna 634, although the scope of the claimed subject matter is not limited in these respects.

In one or more embodiments, information handling system 600 may include a projector 636 that may include control system 100 of FIG. 1 including MEMS platform 114, and furthermore may include any one or more or all of the components of scanned laser display 500 of FIG. 5 such as controller 122, horizontal drive circuit 518, vertical drive circuit 520, and/or laser source 110. In one or more embodiments, projector 636 may be controlled by one or more of processors 610 and/or 612 to implement some or all of the functions of controller 122 of FIG. 1 and/or FIG. 5. In one or more embodiments, projector 636 may comprise a MEMS platform 114 for scanning an image projected by projector 636 where the image may likewise be represented by displayed image 640. Alternatively, projector 636 may include various other display technologies other than a MEMS scanner such as an LCD or LCOS device with appropriate supporting elements. In one or more embodiments, a scanned beam projector may comprise video/graphics block 620 having a video controller to provide video information 638 to projector 636 to display an image represented as displayed image 640. In one or more embodiments, projector 636 may be capable of generating a three-dimensional image on displayed image 640 as discussed herein. However, these are merely example implementations for projector 636 within information handling system 600, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to controlled light source startup in a display and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   powering on a display to display a projected image, the display including a scanner that deflects on at least one axis;
   starting the operation of the scanner by providing a drive signal to cause the scanner to start deflecting on a first axis of the at least one axis;
   receiving a control signal that signifies an amount of torsional deflection of the scanner on the first axis;
   powering a light source of the display at less than full power while the control signal signifies that the torsional deflection is less than a predetermined value; and
   powering the light source at or near full power after the control signal signifies that the torsional deflection has reached the predetermined value.

2. The method as claimed in claim 1, wherein said starting comprises ramping up the operation of the scanner to cause the scanner to oscillate on the first axis.

3. The method as claimed in claim 1, wherein the light source comprises a laser light source.

4. The method as claimed in claim 1, further comprising detecting the torsional deflection with a piezoresistive sensor.

5. The method as claimed in claim 1, wherein said powering a light source of the display at less than full power during said starting comprises increasing a power output of the light source in a step wise manner.

6. The method as claimed in claim 1, further comprising displaying a splash screen during said starting.

7. A display, comprising:
   a light source to emit a light output as a projected image;
   a controller to control the light source;
   a scanner that, in response to a control signal received from the controller, deflects torsionally on a first axis at a first rate, and deflects torsionally on a second axis at a second rate slower than the first rate; and
   at least one sensor to detect the torsional deflection of the scanner on the first axis, and to provide a control signal to the controller;
   wherein the controller causes the light source to emit the light output at a power level less than full power during a starting period in which the torsional deflection of the scanner on the second axis is less than a predetermined value.

8. The display as claimed in claim 7, wherein the sensor comprises a piezoresistive sensor.

9. The display as claim 7, further comprising a memory having a splash screen stored in the memory, wherein the controller controls the light source to display the splash screen while the light source is operating at a power level less than full power during the starting period.

* * * * *